(12) United States Patent
Swepston et al.

(10) Patent No.: US 12,102,115 B2
(45) Date of Patent: *Oct. 1, 2024

(54) ASSEMBLER SYSTEM FOR ASSEMBLING AN ELECTRONIC VAPING ARTICLE

(71) Applicant: Altria Client Services LLC, Richmond, VA (US)

(72) Inventors: Jeffrey A. Swepston, Powhatan, VA (US); Travis M. Garthaffner, Midlothian, VA (US); Christopher R. Newcomb, Powhatan, VA (US); Martin T. Garthaffner, Richmond, VA (US)

(73) Assignee: Altria Client Services LLC, Richmond, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/981,929

(22) Filed: Nov. 7, 2022

(65) Prior Publication Data

US 2023/0053802 A1 Feb. 23, 2023

Related U.S. Application Data

(63) Continuation of application No. 16/918,639, filed on Jul. 1, 2020, now Pat. No. 11,490,652, which is a
(Continued)

(51) Int. Cl.
*B23P 19/00* (2006.01)
*A24C 5/32* (2006.01)
(Continued)

(52) U.S. Cl.
CPC .............. *A24C 5/327* (2013.01); *A24F 40/70* (2020.01); *B23P 19/008* (2013.01); *A24F 40/10* (2020.01)

(58) Field of Classification Search
CPC ........ B23P 19/008; A24F 40/10; A24F 40/70; A24C 5/327
See application file for complete search history.

(56) References Cited

U.S. PATENT DOCUMENTS 2,809,640 A  10/1957 Oldenkamp
3,506,017 A   4/1970 Schubert
(Continued)

FOREIGN PATENT DOCUMENTS

CN   1046664 A   11/1990
CN   1094372 A   11/1994
(Continued)

OTHER PUBLICATIONS

Notice of Allowance dated Sep. 28, 2023 issued in related U.S. Appl. No. 17/572,915.
(Continued)

*Primary Examiner* — Paul D Kim
(74) *Attorney, Agent, or Firm* — Harness, Dickey & Pierce P.L.C

(57) ABSTRACT

An assembler system for manufacturing vapor-generating articles may include a rotatable assembly drum including an outer face and a flute in the outer face. The flute is structured and arranged to hold a first section and a second section of the vapor-generating article. The system also includes a first mechanism that translates the first section relative to the second section while the first section and the second section are in the flute. The system additionally includes a second mechanism that rotates the first section relative to the second section while the first section and the second section are in the flute. The translating and the rotating connect the first section to the second section to form the vapor-generating article.

18 Claims, 9 Drawing Sheets

Related U.S. Application Data continuation of application No. 15/978,321, filed on May 14, 2018, now Pat. No. 10,721,962, which is a continuation of application No. 14/883,980, filed on Oct. 15, 2015, now Pat. No. 9,968,131.

(60) Provisional application No. 62/064,892, filed on Oct. 16, 2014.

(51) Int. Cl.
  *A24F 40/70* (2020.01)
  *H05K 13/04* (2006.01)
  *A24F 40/10* (2020.01)

(56) References Cited

U.S. PATENT DOCUMENTS

| | | | |
|---|---|---|---|
| 3,811,567 | A | 5/1974 | Tomita et al. |
| 3,837,378 | A | 9/1974 | Kanki et al. |
| 3,961,633 | A | 6/1976 | Schubert et al. |
| 3,986,320 | A | 10/1976 | Bausch et al. |
| 4,108,710 | A | 8/1978 | Hoffmann |
| 4,545,832 | A | 10/1985 | Hoffmann |
| 4,980,969 | A | 1/1991 | Marchesini et al. |
| 5,024,046 | A | 6/1991 | Spatafora et al. |
| 5,024,242 | A | 6/1991 | Garthaffner et al. |
| 5,116,298 | A | 5/1992 | Bondanelli et al. |
| 5,390,469 | A | 2/1995 | Shimizu et al. |
| 5,464,495 | A | 11/1995 | Eder |
| 5,577,518 | A | 11/1996 | Draghetti et al. |
| 5,702,559 | A | 12/1997 | Bright |
| 5,772,001 | A | 6/1998 | Otruba et al. |
| 6,450,230 | B1 | 9/2002 | Otruba |
| 6,708,694 | B2 | 3/2004 | Dombek |
| 7,296,578 | B2 | 11/2007 | Read, Jr. |
| 8,828,170 | B2 | 9/2014 | Stamatiou et al. |
| 9,828,130 | B2 | 11/2017 | Florian et al. |
| 9,854,839 | B2 | 1/2018 | Tucker et al. |
| 9,877,516 | B2 | 1/2018 | Tucker et al. |
| 9,963,260 | B2 | 5/2018 | Cadieux et al. |
| 9,968,131 | B2 | 5/2018 | Swepston et al. |
| 10,676,228 | B2 | 6/2020 | Cadieux et al. |
| 10,858,137 | B2 | 12/2020 | Garthaffner |
| 10,986,874 | B2 * | 4/2021 | Tucker ............... A24F 40/30 |
| 10,988,368 | B2 | 4/2021 | Biel et al. |
| 11,090,450 | B2 * | 8/2021 | Li ..................... A24F 40/42 |
| 11,490,652 | B2 * | 11/2022 | Swepston ............ A24F 40/70 |
| 2002/0005207 | A1 | 1/2002 | Wrenn et al. |
| 2004/0020500 | A1 | 2/2004 | Wrenn et al. |
| 2005/0217207 | A1 | 10/2005 | Konishi et al. |
| 2008/0017203 | A1 | 1/2008 | Fagg et al. |
| 2012/0167906 | A1 | 7/2012 | Gysland |
| 2013/0199550 | A1 | 8/2013 | Ono |
| 2014/0041655 | A1 | 2/2014 | Barron et al. |
| 2014/0261492 | A1 * | 9/2014 | Kane .................. A24F 40/485 |
| | | | 131/328 |
| 2015/0272204 | A1 | 10/2015 | Kraisuwannasarn |
| 2015/0289565 | A1 | 10/2015 | Cadieux et al. |
| 2017/0006921 | A1 | 1/2017 | Lemay et al. |

FOREIGN PATENT DOCUMENTS

| | | | |
|---|---|---|---|
| CN | 1203699 | A | 12/1998 |
| CN | 1268470 | A | 10/2000 |
| CN | 101310632 | A | 11/2008 |
| CN | 201758770 | U | 3/2011 |
| CN | 102177071 | A | 9/2011 |
| CN | 202603608 | U | 12/2012 |
| CN | 203015835 | | 6/2013 |
| CN | 103369979 | A | 10/2013 |
| CN | 103491812 | A | 1/2014 |
| CN | 103584287 | A | 2/2014 |
| DE | 1532561 | A1 | 4/1970 |
| DE | 3117999 | A1 | 11/1982 |
| DE | 202006006452 | U1 | 7/2006 |
| EP | 0212879 | A1 | 3/1987 |
| EP | 0330495 | A2 | 8/1989 |
| EP | 0395280 | A2 | 10/1990 |
| EP | 0544089 | A2 | 6/1993 |
| EP | 0579026 | A1 | 1/1994 |
| JP | 2005247325 | A | 9/2005 |
| WO | WO-2013002657 | A1 | 1/2013 |
| WO | WO-2013076750 | A1 | 5/2013 |
| WO | WO-2014064613 | A1 | 5/2014 |
| WO | WO-2015/123558 | A2 | 8/2015 |
| WO | WO-2015160809 | A1 | 10/2015 |

OTHER PUBLICATIONS

International Search Report and Written Opinion issued in International Application No. PCT/US2015/025754, mailed Sep. 3, 2015.
International Preliminary Report on Patentability issued in International Application No. PCT/US2015/025754, mailed Oct. 27, 2016.
International Preliminary Report on Patentability issued in International Application No. PCT/IB2015/001477, mailed Oct. 27, 2016.
International Search Report dated Feb. 5, 2016, issued in corresponding International Application No. PCT/US2015/055667.
Written Opinion of the International Searching Authority dated Feb. 5, 2016, issued in corresponding International Application No. PCT/US2015/055667.
"E cigarette labeling machine" uploaded by Cherry Wang, Sep. 1, 2014 [retrieved on Feb. 1, 2016]; Retrieved from the Internet: <URL:https://www.youtube.com/watch?v=7uFodYd0xTI>>. times 0:00s to 0:30s.
"Labeling machine auto labeler equipment for Electronic cigarette" uploaded by Penglai Industrial Corporation Limited, Sep. 17, 2013 [retrieved Feb. 1, 2016]: Retrieved from the Internet: <URL:https://www.youtube.com/watch?v=zKyXiOYS8_Y>>. time 0:00s to 1:10s.
International Search Report dated Feb. 26, 2016, issued in corresponding International Application No. PCT/US2015/066290.
Written Opinion of the International Searching Authority dated Feb. 26, 2016, issued in corresponding International Application No. PCT/US2015/066290.
International Preliminary Report and Written Opinion of the International Searching Authority dated Apr. 27, 2017, issued in corresponding International Application No. PCT/US2015/055667.
International Preliminary Report on Patentability issued in International Application No. PCT/US2015/066290, mailed Jun. 20, 2017.
Non-Final Office Action dated Aug. 2, 2017 in copending U.S. Appl. No. 14/883,980.
Third Party Observation issued in European Application No. 15791025.8 mailed Aug. 18, 2017.
Ampoule, from Wikipedia, the free encyclopedia, retrieved from https://en.wikipedia.org/w/index.php?title=Ampoule&oldid=784220607, page last edited Jun. 7, 2017.
Vial, from Wikipedia, the free encyclopedia, retrieved from https://en.wikipedia.org/w/index.php?title=Vial&oldid=771730942, page last edited Mar. 23, 2017.
Chinese Office Action dated Aug. 30, 2017 for corresponding Chinese Patent Application No. 201580031588.
Office Action for corresponding U.S. Appl. No. 14/686,431 dated Nov. 1, 2017.
Search Report for corresponding European App. No. 15791025.8 dated Nov. 2, 2017.
Third Party observations for corresponding European App. No. 15791025.8 dated Oct. 27, 2017.
International Search Report dated Feb. 3, 2016, issued in corresponding International Application No. PCT/IB2015/001477.
Written Opinion of the International Searching Authority dated Feb. 3, 2016, issued in corresponding International Application No. PCT/IB2015/001477.
Office Action for co-pending U.S. Appl. No. 14/686,519 dated Jun. 7, 2017.
Office Action for corresponding European Application No. 15850828.3 dated May 18, 2018.
Search Report for corresponding European Application No. 15871050.9 dated Jul. 23, 2018.

(56) References Cited

OTHER PUBLICATIONS

Office Action for corresponding Eurasian Application No. 201692054 dated Jul. 26, 2018 and English translation thereof.
Chinese Office Action dated Sep. 17, 2018 for corresponding Chinese Application No. 201580031565.9.
European Office Action issued Sep. 28, 2018 in corresponding Application No. 15 791 025.8.
Office Action for corresponding Chinese Application No. 201580069381.1 dated Nov. 2, 2018.
Office Action for corresponding Eurasian Application No. 201791107 dated Jan. 30, 2019 and English translation.
Office Action for corresponding Eurasian Application No. 1611599/75EA dated Jan. 30, 2019.
Office Action for corresponding U.S. Appl. No. 14/972,791 dated Apr. 5, 2019.
Chinese Office Action dated Jun. 5, 2019, issued in corresponding Chinese Patent Application No. 201580055337.5.
Office Action for corresponding U.S. Appl. No. 14/686,431 dated Jun. 27, 2019.
Office Action for corresponding U.S. Appl. No. 14/972,791 dated Oct. 22, 2019.
Office Action for corresponding U.S. Appl. No. 15/869,615 dated Nov. 5, 2019.
Office Action for corresponding U.S. Appl. No. 14/686,431 dated Dec. 20, 2019.
US Notice of Allowance dated Feb. 12, 2020 for corresponding U.S. Appl. No. 15/869,615.
Office Action for corresponding U.S. Appl. No. 15/978,321 dated Feb. 13, 2020.
U.S. Notice of Allowance dated Mar. 26, 2020 for corresponding U.S. Appl. No. 15/978,321.
Notice of Allowance of U.S. Appl. No. 14/972,791 dated Aug. 20, 2020.
Office Action for U.S. Appl. No. 16/877,706 dated Jun. 8, 2021.
Office Action for U.S. Appl. No. 17/103,226 date Jun. 9, 2021.
U.S. Notice of Allowance dated Oct. 20, 2021 for corresponding U.S. Appl. No. 17/103,226.
U.S. Notice of Allowance dated Oct. 20, 2021 for corresponding U.S. Appl. No. 16/877,706.
Non-Final Office Action dated Feb. 9, 2022 in copending U.S. Appl. No. 16/918,639.
Notice of Allowance for U.S. Appl. No. 16/918,639 dated Jul. 20, 2022.
Office Action for corresponding Eurasian Application No. 201692055 dated Feb. 20, 2019.
Notice of Allowance dated Mar. 20, 2024 issued in U.S. Appl. No. 17/572,751.
Notice of Allowance dated May 6, 2024 issued in U.S. Appl. No. 18/167,446.
Notice of Allowance dated May 22, 2024 issued in U.S. Appl. No. 17/572,751.
Notice of Allowance dated Jun. 14, 2024 issued in U.S. Appl. No. 18/167,446.

* cited by examiner

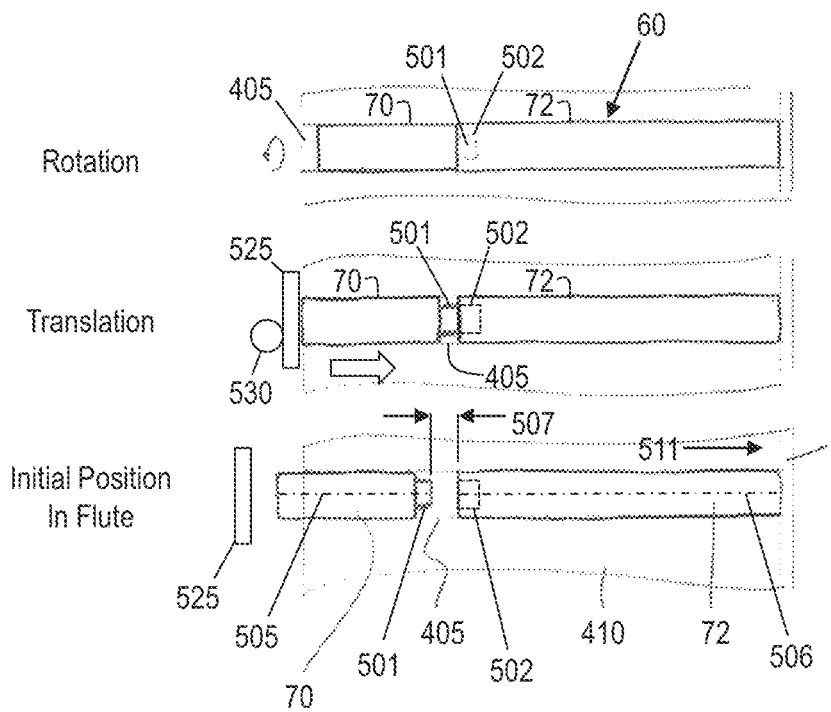
FIG. 5c
FIG. 5b
FIG. 5a
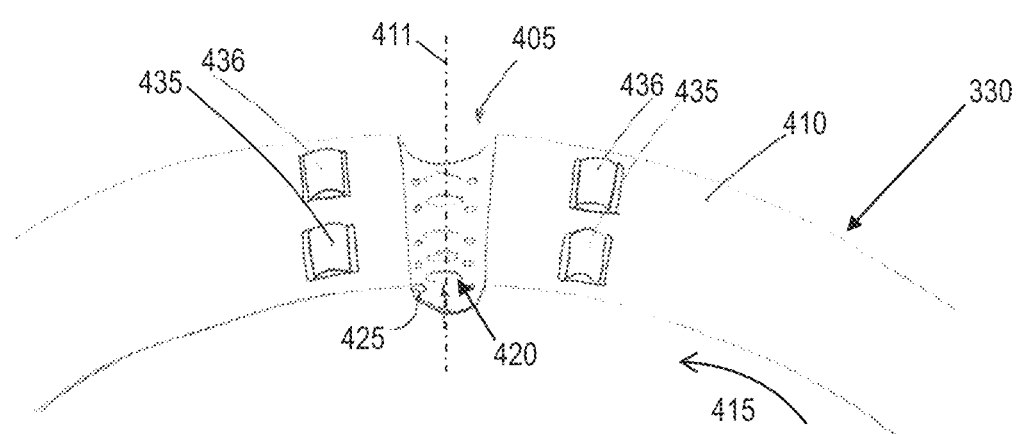
FIG. 4

ASSEMBLER SYSTEM FOR ASSEMBLING AN ELECTRONIC VAPING ARTICLE

CROSS-REFERENCE TO RELATED APPLICATIONS

This application is a continuation under 35 U.S.C. § 120 of U.S. application Ser. No. 16/918,639, filed Jul. 1, 2020, now U.S. Pat. No. 11,490,652, which is a continuation under 35 U.S.C. § 120 of U.S. application Ser. No. 15/978,321, filed May 14, 2018, now U.S. Pat. No. 10,721,962, which is a continuation under 35 U.S.C. § 120 of U.S. application Ser. No. 14/883,980, filed Oct. 15, 2015, now U.S. Pat. No. 9,968,131, which claims priority under 35 U.S.C. § 119(e) to U.S. Provisional No. 62/064,892, filed Oct. 16, 2014, the entire contents of each of which are incorporated herein by reference.

BACKGROUND

Field

This disclosure relates generally to systems and methods for manufacturing vapor-generating articles and, more particularly, to systems and methods for manufacturing electronic vaping articles.

Description of the Related Art

Conventionally, electronic vapor-generating articles are manufactured via a number of manual operations. However, such operations are not only labor intensive and time consuming but also more prone to inconsistency.

SUMMARY

Some example embodiments described herein are directed to automated processes for use in the manufacture of electronic vapor-generating articles, such as electronic vapor devices, regardless of their size and shape. Aspects are directed to an automated assembler workstation for use in manufacturing electronic vapor devices. The assembler workstation may include a rotatable assembly drum having a cylindrical drum surface with flutes that are configured to hold first and second sections of an electronic vapor device. The assembler workstation may include a mechanism for causing translational movement of the first section relative to the second section within the flute, and a mechanism for causing rotational movement of the first section or the second section or both within the flute. The assembler workstation may be structured and arranged such that the translational movement and rotational movement result in connecting the first section to the second section to form a fully assembled component, such as an electronic vapor device. In this manner, the assembler workstation is useful as an automated system for manufacturing electronic vapor devices.

In accordance with an example embodiment disclosed herein, there is an assembler system for use in manufacturing vapor-generating articles. The system includes a rotatable assembly drum including an outer face and a flute in the outer face. The flute is structured and arranged to hold a first section and a second section of the vapor-generating article. The system also includes a first mechanism that translates the first section relative to the second section while the first section and the second section are in the flute. The system additionally includes a second mechanism that rotates the first section relative to the second section while the first section and the second section are in the flute. The translating and the rotating connect the first section to the second section to form the vapor-generating article.

According to another example embodiment, there is a method of assembling a vapor-generating article. The method includes receiving a first section of the vapor-generating article and a first section of the vapor-generating article in a flute of a rotatable assembly drum while the assembly drum is rotating. The method also includes moving the first section toward the second section while the first section and the second section are in the flute and while the assembly drum is rotating. The method additionally includes connecting the first section to the second section while the first section and the second section are in the flute and while the assembly drum is rotating, wherein the connecting the first section to the second section forms the vapor-generating article. The method further includes transferring the vapor-generating article out of the flute while the assembly drum is rotating.

BRIEF DESCRIPTION OF THE DRAWINGS

Various aspects are further described in the detailed description which follows, in reference to the noted plurality of drawings by way of non-limiting examples of embodiments, in which like reference numerals represent similar parts throughout the several views of the drawings.

FIG. 4 shows a flute of an assembly drum in accordance with an example embodiment;

FIGS. 5a-5c show aspects of connecting a cartridge unit and a battery section in a flute of an assembly drum in accordance with an example embodiment;

DETAILED DESCRIPTION

Figure 1A:
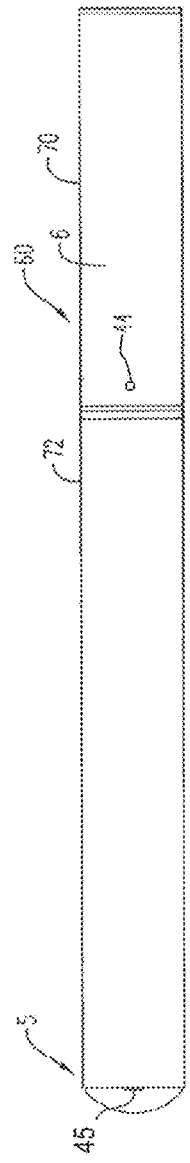
FIGS. 1a, 1b, 1c, and 1d show electronic vapor devices in accordance with various example embodiments.

Various aspects will now be described with reference to specific forms selected for purposes of illustration. It will be appreciated that the spirit and scope of the apparatus, system, and methods disclosed herein are not limited to the selected forms. Moreover, it is to be noted that the figures provided herein are not drawn to any particular proportion or scale, and that many variations can be made to the illustrated forms. Reference is now made to FIGS. 1-11, wherein like numerals are used to designate like elements throughout.

Each of the following terms written in singular grammatical form: "a," "an," and "the," as used herein, may also refer to, and encompass, a plurality of the stated entity or object, unless otherwise specifically defined or stated herein, or, unless the context clearly dictates otherwise. For example, the phrases "a device," "an assembly," "a mechanism," "a component," and "an element," as used herein, may also refer to, and encompass, a plurality of devices, a plurality of assemblies, a plurality of mechanisms, a plurality of components, and a plurality of elements, respectively.

Each of the following terms: "includes," "including," "has," "having," "comprises," and "comprising," and, their linguistic or grammatical variants, derivatives, and/or conjugates, as used herein, means "including, but not limited to."

Throughout the illustrative description, the examples, and the appended claims, a numerical value of a parameter, feature, object, or dimension, may be stated or described in terms of a numerical range format. It is to be fully understood that the stated numerical range format is provided for illustrating implementation of the forms disclosed herein, and is not to be understood or construed as inflexibly limiting the scope of the forms disclosed herein.

Moreover, for stating or describing a numerical range, the phrase "in a range of between about a first numerical value and about a second numerical value," is considered equivalent to, and means the same as, the phrase "in a range of from about a first numerical value to about a second numerical value," and, thus, the two equivalently meaning phrases may be used interchangeably.

It is to be understood that the various forms disclosed herein are not limited in their application to the details of the order or sequence, and number, of steps or procedures, and sub-steps or sub-procedures, of operation or implementation of forms of the method or to the details of type, composition, construction, arrangement, order and number of the system, system sub-units, devices, assemblies, sub-assemblies, mechanisms, structures, components, elements, and configurations, and, peripheral equipment, utilities, accessories, and materials of forms of the system, set forth in the following illustrative description, accompanying drawings, and examples, unless otherwise specifically stated herein. The apparatus, systems, and methods disclosed herein can be practiced or implemented according to various other alternative forms and in various other alternative ways.

It is also to be understood that all technical and scientific words, terms, and/or phrases, used herein throughout the present disclosure have either the identical or similar meaning as commonly understood by one of ordinary skill in the art, unless otherwise specifically defined or stated herein. Phraseology, terminology, and, notation, employed herein throughout the present disclosure are for the purpose of description and should not be regarded as limiting.

Aspects described herein are directed to an assembler workstation for use in manufacturing electronic vaping articles including, but not limited to, electronic vapor devices. Embodiments are described with reference to electronic vapor devices, but it is understood that aspects described herein may be used with any type of electronic vaping article and, more generally, any type of vapor-generating article. The assembler workstation described herein includes a rotating, cylindrical assembly drum that holds a first section and a second section of an electronic vapor device, and mechanisms that move the first section and the second section into connected engagement with one another while the first section and the second section are held in a flute on the assembly drum. The first section may be a cartridge unit of an electronic vapor device and the second section may be a battery section of the electronic vapor device, such that the assembler workstation is useful for assembling electronic vapor devices during manufacturing operations.

Electronic Vapor Device Layout

Figure 1B:
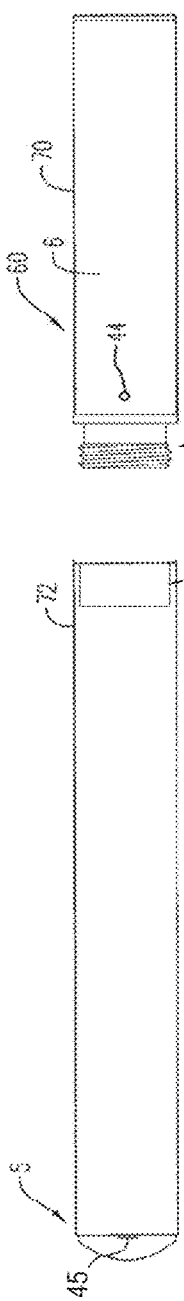
Figure 1C:
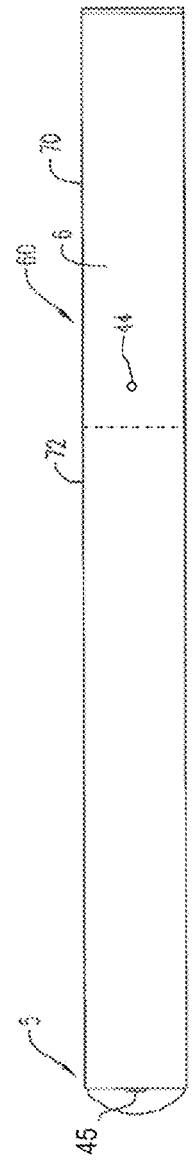

Referring to FIGS. 1a and 1b, an electronic vapor device (article) 60 is provided and comprises a replaceable cartridge (also called a first section or cartridge unit) 70 and a reusable fixture (also called a second section or battery section) 72, which in a non-limiting embodiment are coupled together at a connection 205. In example embodiments, the first section 70 includes a first connection structure 501 and the second section 72 includes a second connection structure 502 that is configured to engage the first connection structure 501 for coupling the first section 70 to the second section 72 to form a complete electronic vapor device 60. The connection structures 501 and 502 may be any suitable connection structures, such as male and female threaded connectors, a bayonet and snug-fit receiver, detent, clamp and/or clasp.

Generally, the second section 72 may include a puff sensor that is responsive to air drawn into the second section 72 via an air inlet port 45 adjacent the free end or tip of the electronic vapor device 60, a battery, and control circuitry. The disposable first section 70 may include a supply region (reservoir) and a heater that vaporizes a pre-vapor formulation that is drawn from the supply region through a wick. A pre-vapor formulation is a material or combination of materials that may be transformed into a vapor. For example, the pre-vapor formulation may be a liquid, solid, and/or gel formulation including, but not limited to, water, beads, solvents, active ingredients, ethanol, plant extracts, natural or artificial flavors, and/or vapor formers such as glycerine and propylene glycol. In a non-limiting embodiment, the supply region may be a liquid supply region that contains an e-liquid.

Figure 1D:
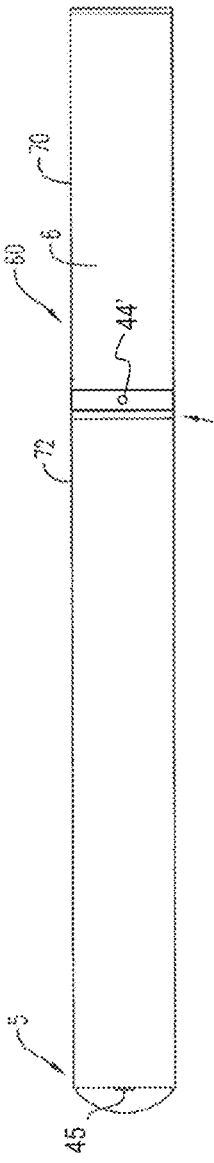

The first section 70 may be a vaporizer section and may include an outer housing 6 that houses the liquid supply region, heater, and wick. Upon completing the connection 205, the battery of the second section 72 is connectable with the electrical heater of the first section 70 upon actuation of the puff sensor. Air may be drawn primarily into the first section 70 through one or more air inlets 44 during drawing action upon the mouth end of the first section 70. The drawing action is communicated to a puff sensor in the second section 72, which causes the battery-powered heater to vaporize some of the liquid from the liquid supply region. The vaporized liquid is entrained in the air that is drawn in through the one or more air inlets 44 and delivered to the mouth of the adult vaper via one or more ports at the mouth end of the first section 70. As shown in FIG. 1d, the one or more air inlets 44' may be located at a structure associated with the connection 205, including but not limited to a connector ring between the first section 70 and the second section 72.

In a non-limiting embodiment, once the liquid of the cartridge is spent, only the first section 70 is replaced. An alternate arrangement shown in FIG. 1c includes an implementation in which the first section 70 and the second section 72 are integrally attached, such that the entire electronic vapor device 60 is disposed once the liquid supply is depleted. In such a case, the battery type and other features might be engineered for simplicity and cost-effectiveness, but generally embodies the same concepts as in a non-limiting embodiment in which the second section is reused and/or recharged.

The electronic vapor device 60 may be about 80 mm to about 110 mm long, such as about 80 mm to about 100 mm long and about 7 mm to about 10 mm or more in diameter. For example, in a non-limiting embodiment, the electronic vapor device 60 is about 84 mm long and has a diameter of about 7.8 mm. Implementations are not limited to these dimensions, and aspects described herein may be adapted for use with any size electronic vaping article.

At least one adhesive-backed label may be applied to the outer housing 6 of the first section 70. The label completely circumscribes the electronic vapor device 60 and can be colored and/or textured. The label can include holes therein which are sized and positioned so as to prevent blocking of the air inlets 44.

The outer housing 6 may be formed of any suitable material or combination of materials. Examples of suitable materials include metals, alloys, plastics, paper, fiberglass (including woven fiberglass) or composite materials containing one or more of those materials, or thermoplastics that are suitable for food or pharmaceutical applications, for example polypropylene, polyetheretherketone (PEEK), ceramic, and polyethylene. It can be beneficial for the material to be light and non-brittle. In a particular implementation, the outer housing 6 may be composed of metal (e.g., aluminum or aluminum alloy).

Automated Manufacture Using Rotating Drums

Figure 2A:
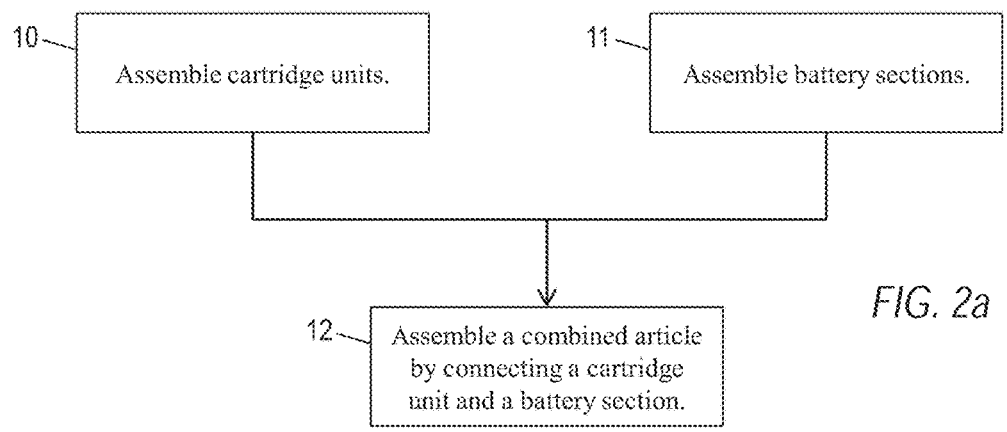
FIG. 2a is a block diagram of a process for automated assembly of electronic vapor devices in accordance with an example embodiment.

FIGS. 2a-2d show aspects of systems and methods for the automated manufacture of vapor-generating articles (such as, by way of example, electronic vapor devices) using rotating drums in accordance herewith. FIG. 2a is a block diagram of a process for automated assembly of electronic vapor devices in accordance with an example embodiment. The process may include assembling cartridge units (first sections) at step 10; assembling battery sections (second sections) at step 11; and assembling a combined article including a respective cartridge unit connected to a respective battery section at step 12.

The assembling the cartridge units at step 10 may include, for example: assembling and delivering open-ended, partially-assembled cartridge units; establishing a procession of the open-ended, partially-assembled cartridge units; adding liquid to the liquid supply region of the cartridge units; inserting a respective downstream gasket into each of the cartridge units; inserting a respective mouth-end insert into each of the cartridge units; and applying a respective label to the outer housing of each of the cartridge units.

The assembling battery sections at step 11 may include, for example: establishing a procession of partially-assembled battery sections; inserting at least one of a puff sensor, a battery, and control circuitry in each of the battery sections; and applying a respective label to the outer housing of each of the battery sections. Steps 10 and 11 may be performed in any desired order, including in series with one another, in parallel with one another, intermittently in series and/or parallel, etc.

The assembling the combined article at step 12 may include, for example: connecting a respective cartridge unit to a respective battery section. In this manner, the combined article is an electronic vapor device 60 comprising a cartridge unit 70 connected to a battery section 72 such as that shown in FIG. 1a or 1d.

In example embodiments, the processes performed at steps 10-12 are automated, e.g., using computer-controlled manufacturing machinery. In additional aspects, the cartridge units 70 and battery sections 72 are handled and transported during and between steps 10-12 in an automated manner, e.g., using rotating drums as described herein. In even further aspects, one or more inspection processes is performed during and/or after each one of steps 10-12, e.g., to detect cartridge units 70 and/or battery sections 72 that are out of specification. The method is not limited to the particular steps 10-12; instead, more or less steps and/or different steps and/or a different order of steps may be used.

Figure 2B:
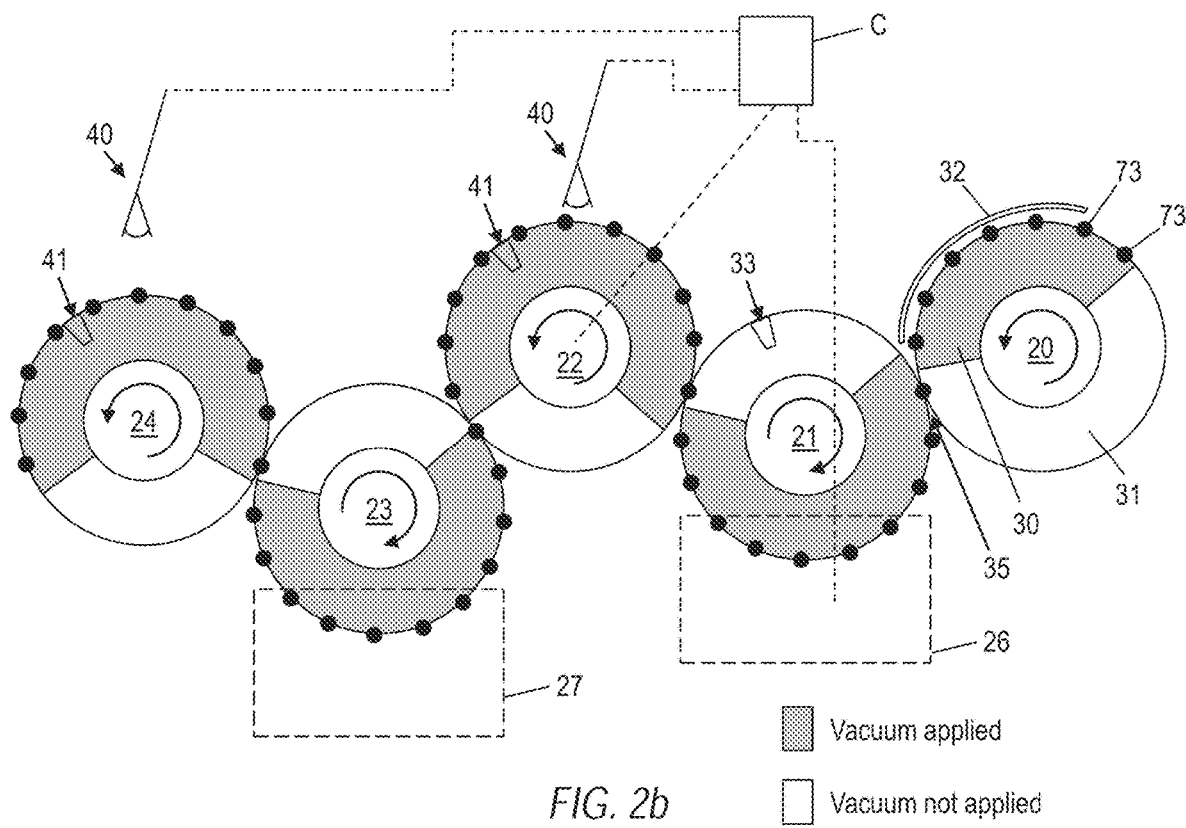
FIGS. 2b-2d show aspects of systems and methods for the automated manufacture of electronic vapor devices using rotating drums in accordance with an example embodiment.
Figure 2C:
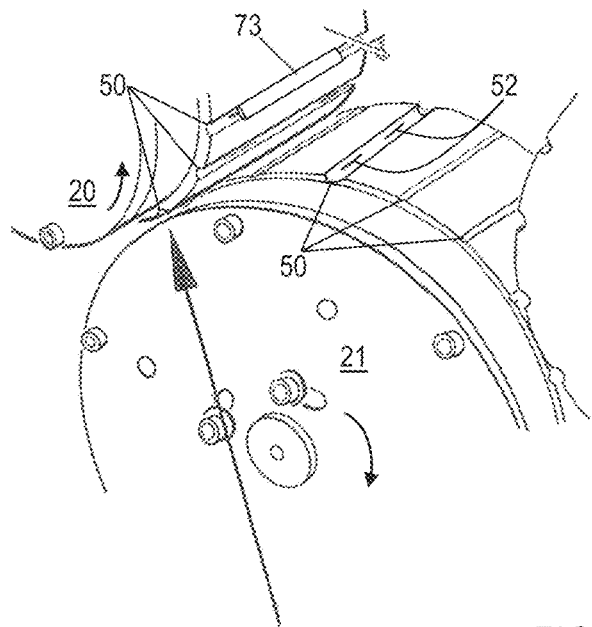
Figure 2D:
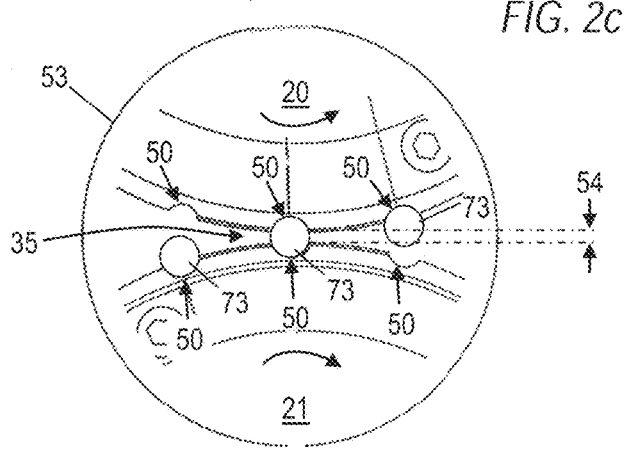
Figure 2D:
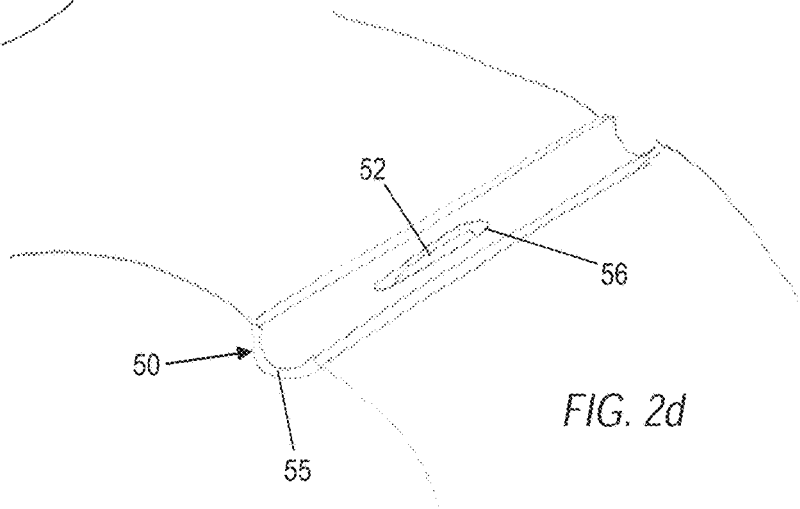

FIGS. 2b-2d depict drum-to-drum transfer systems and methods that may be used with aspects of automated assembly of electronic vapor devices in accordance with an example embodiment. Aspects shown in FIGS. 2b-2d may be used in the handling and transporting of cartridge units 70 and battery sections 72 during and between steps 10-12 described with respect to FIG. 2a, for example. FIGS. 2b-2d are described with respect to sections 73 that are shown individually as solid circles and that may represent cartridge units 70 or battery sections 72. As shown in FIG. 2b, a procession of a plurality of sections 73 may be carried by a plurality of rotating drums 20-24 to work stations 26, 27 where manufacturing/assembly processes are performed on the sections 73. The work stations 26, 27 may correspond to any of steps 10-12. In addition, work station 26 may include machinery configured to insert a respective downstream gasket into each of the sections, and work station 27 may include machinery configured to insert a respective mouth-end insert into each of the sections. Although only two work stations 26, 27 are shown for simplicity, it is understood that rotating drums similar to drums 20-24 may be used to carry sections 73 to other work stations during the automated manufacture of electronic vapor devices.

In example embodiments, each drum 20-24 may include a cylindrical body with a plurality of grooves (also called flutes) spaced apart on its roll face. Each flute may be structured and arranged to hold and carry a section 73 of an electronic vapor device, such as a cartridge unit or battery section. As described in greater detail with respect to FIGS. 2c and 2d, each flute may include a resilient (e.g., yieldable) material that directly contacts the section 73 when the section 73 is held in the flute and carried by the rotating drum.

Still referring to FIG. 2b, each drum 20-24 may include a rotatable fluted drum portion and a fixed internal vacuum plenum. The vacuum system selectively applies a vacuum to vacuum ports in the flutes of the rotatable drum portion as the latter rotates over the angular extent of the respective vacuum plenum. The communicated vacuum assists in holding the sections 73 in the flutes during rotation of the drum. For example, the system may be adapted such that during rotation of the drums 20-24, flutes that are located in shaded areas 30 are communicated with a vacuum, while flutes that are located in unshaded areas 31 are not communicated with a vacuum. Specifically, a particular flute on counterclockwise rotating drum 20 is communicated with a vacuum when the flute is moving through the shaded area 30, and is not communicated with a vacuum when the flute is moving through the unshaded area 31. Vacuum is communicated to each flute on each drum individually, such as via a vacuum port in each flute and a vacuum source internal to the drum that selectively applies a vacuum force to the vacuum port in a particular flute based on the angular position of the particular flute along the rotational path of the roll face of the drum.

Rails 32 may also be provided adjacent to one or more of the drums 20-24 to assist in maintaining the sections 73 in the flutes. Further, cleaning air may be communicated to the port(s) of each flute at angular positions such as that indicated by area 33. The cleaning air may be selectively applied to each flute individually.

In example embodiments, when transferring a section 73 from a donating flute of a first drum to a receiving flute of a second drum, e.g., from drum 20 to drum 21, a vacuum force is deactivated at the donating flute when the donating flute is at a location prior to the nip 35 between the first drum and the second drum. Also, a vacuum force is activated at the receiving flute when the receiving flute is at a location prior to the nip 35 between the first drum and the second drum. This coordination of the timing of the respective vacuum forces applied at the donating flute and the receiving flute is depicted by shaded areas 30 and unshaded areas 31 in FIG. 2b and facilitates moving the section 73 out of the donating flute and into the receiving flute.

With continued reference to FIG. 2b, the system may include a controller "C" that is operatively connected to one or more elements. As described herein, the controller "C" may be a computer-based controller that employs hardware and software to perform automated control processes. For example, the controller "C" may be operatively connected to one or more detectors 40 for the purpose of inspecting and/or tracking sections 73 during the automated manufacturing. The detectors 40 may comprise cameras or other optical detecting mechanisms that detect optical characteristics and/or information of the sections 73 and transmit the detected optical characteristics and/or information to the controller "C."

For inspection purposes, the controller "C" may determine whether a section 73 is out of specification, e.g., not properly assembled, damaged, etc., by comparing the detected optical characteristics to predefined optical criteria. Any section 73 that is determined to be out of specification based on the detecting may be ejected from one of the rotating drums, e.g., by selectively applying a jet of air to the flute, e.g., as indicated at location 41, to eject the section 73 from the flute. It is envisioned that an inspection station may be located downstream of the ejection station 41, to confirm proper operation of the ejection station 41. The controller "C" may be programmed to track any empty flute position resulting from an ejection, and to track the empty flute position through the system (e.g., the entire system or to the next downstream workstation).

Alternatively or in addition, for tracking purposes, each section 73 may be encoded with information such as: date of manufacture, unique tracking identification, authentication, lot number, facility identification, and model number. More specifically, the individual sections 73 may be printed with indicia that provide such information. The detectors 40 may include a device, such as a camera or bar code reader, which reads the encoded information on each of the cartridge units as the sections are moved by the drums 20-24. The controller "C" may be programmed to track the position of each section 73 in the system based on the encoded information detected by the detectors 40.

As depicted in FIG. 2b, the controller "C" may also be operatively connected to the drums 20-24, for example, to control the rotational speed of each drum. The controller "C" may also be operatively connected to the work stations 26, 27, for example, to control aspects of the automated processes that are performed at the stations.

FIGS. 2c and 2d show aspects of the flutes and drums as described herein. In example embodiments, the flutes 50 that receive and carry the sections 73 are embodied as grooves or channels at the outer surface (e.g., roll face) of the rotating drums (e.g., drums 20-24). As shown in FIG. 2c, the longitudinal axis of the section 73 is transverse to the direction of rotation of the drum when the section 73 is seated in the flute 50. Each flute 50 may include at least one port 52 that is in communication with a vacuum/pressure source of the drum. Depending on the angular location of the flute 50 along the rotational path of the drum, the vacuum/pressure source of the drum may selectively apply a vacuum, an air jet, or no force at the port 52, e.g., as described with respect to areas 30, 31, and 33 of FIG. 2b.

As shown in the magnified portion 53 of FIG. 2c, in non-limiting embodiments there is a clearance 54 between the roll surfaces of the respective drums (e.g., drums 20 and 21) at the nip 35 between the drums. For example, when the section 73 has an outside diameter of about 7.8 mm, the clearance 54 may be about 0.5 mm to about 1 mm, although any suitable dimension of clearance may be used.

As shown in FIG. 2d, the surface of each flute 50 may be coated or covered with a resilient (e.g., yieldable) material 55. An opening 56 in the resilient material 55 aligns with the port 52 such that vacuum or an air jet may be applied to the flute via the port 52 and opening 56. The resilient material 55 may be applied to surfaces of the drum outside of the flutes 50, for example, over the entire roll face of the drum. In another embodiment, the entire drum (e.g., drums 20-24) may be constructed of the resilient material 55. In another embodiment, the resilient material 55 is provided over less than the entire flute 50; for example, a seat of resilient material may be provided in a sub-section of a flute. Such a resilient material 55 may be used with any type of drum based on the system requirements, including but not limited to a wrapping drum, MR drum, roll hand, etc.

In accordance with aspects herein, the resilient material 55 comprises a material that is softer (i.e., has a lower hardness) than the material of the outer surface of the section 73. For example, in a non-limiting embodiment, the outer surface of a section 73 may be composed of a metal or metal alloy and the resilient material 55 may be composed of a plastic or rubber material. The outer surface may be composed of an aluminum alloy and the resilient material 55 is composed of polyoxymethylene (POM, Delrin, etc.), although example embodiments are not limited to these materials and any suitable materials may be used.

The resilient material 55 facilitates handling the sections 73 during the speeds that are involved with the rotating drums during the automated manufacture of electronic vapor devices 60 as described herein. In particular, the yieldable nature of the resilient material 55 promotes a more complete seal of the section 73 at the vacuum port in a flute, which enhances the vacuum retention force applied to the section 73 in the flute. Such arrangement assures retention of articles on the flutes even at higher production speeds and/or with heavier, larger articles.

Figure 3:
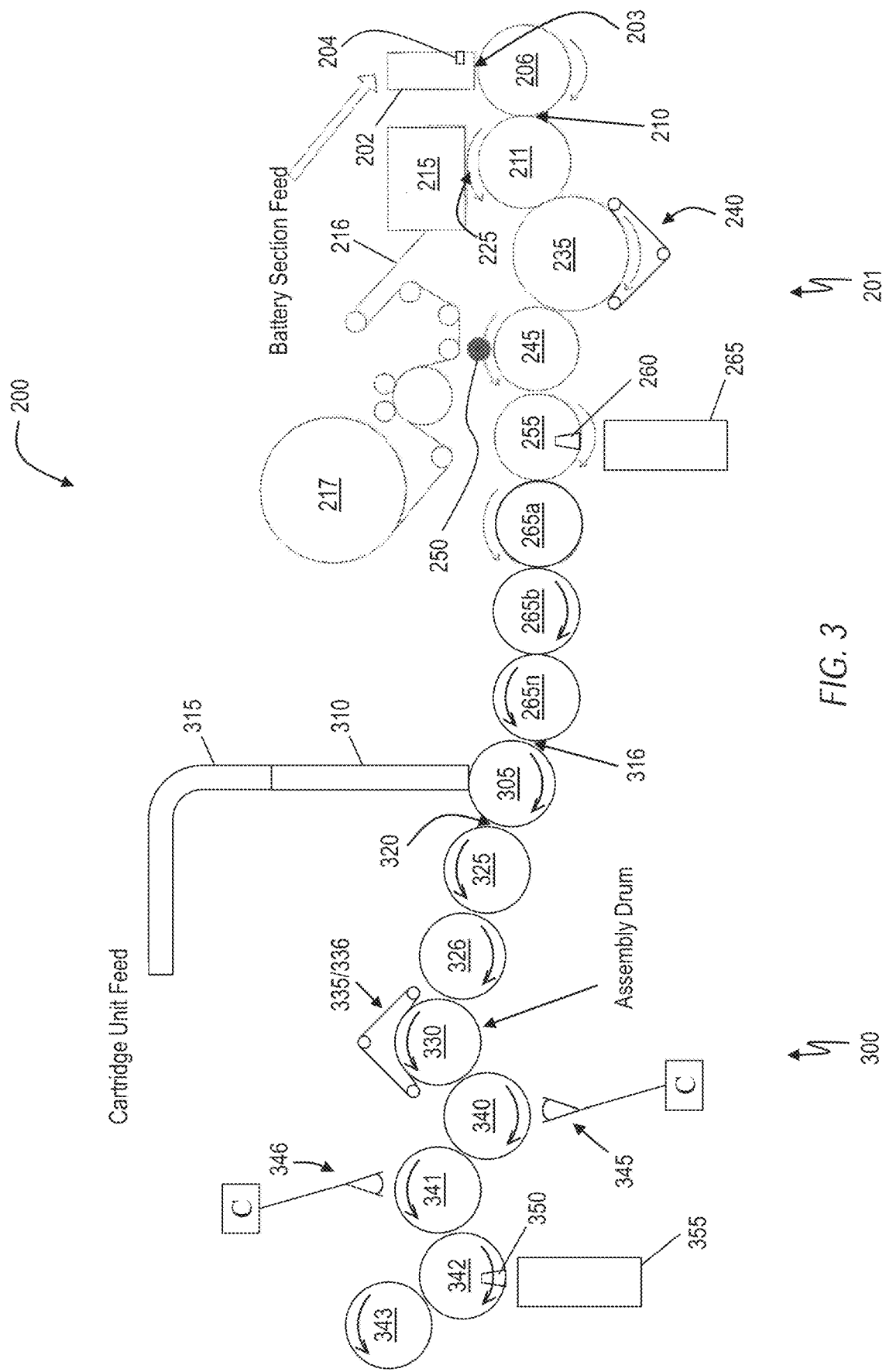
FIG. 3 shows aspects of a system for the automated assembly of electronic vapor devices in accordance with an example embodiment.

FIG. 3 shows aspects of a system 200 for the automated assembly of electronic vapor devices in accordance with an example embodiment. In example embodiments, the system 200 includes a labeler workstation 201 that operates to automatically apply a label (e.g., wrapper) on an outer surface of each battery section 72. The labeler workstation 201 may operate in a manner disclosed in U.S. Patent Application No. 61/979,330 and/or U.S. Pat. No. 5,024,242, the entire contents of both of which are expressly incorporated herein by reference. The system 200 also includes an assembler workstation 300 that operates to automatically connect a respective cartridge unit 70 to a respective battery section 72 to complete a fully assembled electronic vapor device, such as that shown in FIGS. 1a and 1d. The labeler workstation 201 and the assembler workstation 300 each may include rotating drums that transport cartridge units 70 and/or battery sections 72 using drum-to-drum transport techniques as described with respect to FIGS. 2b-2d.

With reference to FIG. 3, in example embodiments the labeler workstation 201 may include an accumulator 202 that receives and holds a plurality of battery sections 72 after each battery section 72 has been assembled with a puff sensor, battery, and control circuitry, for example as described with respect to step 11 of FIG. 2a. The accumulator 202 may comprise, for example, a zig-zag or S-shaped pathway through which the battery sections 72 travel between an accumulator inlet and an accumulator outlet 203. The accumulator inlet may be vertically higher than the accumulator outlet 203 such that the battery sections 72 travel through the accumulator via gravity. The accumulator 202 may be sized to receive battery sections 72 at the accumulator inlet at a faster rate than battery sections 72 are released at the accumulator outlet 203. In this manner, the accumulator 202 provides a buffer that compensates for empty slots in the procession, e.g., battery sections 72 that were ejected from the procession based on the inspection step or missing in the procession as a result of inconsistent loading.

A sensor 204, such as a photo eye or similar, may be arranged at the accumulator 202 to determine whether the amount of battery sections 72 in the accumulator 202 exceeds a threshold. The sensor 204 may be operatively connected to a controller of the system 200. When the sensor 204 communicates to the controller that the level of battery sections 72 in the accumulator 202 falls below the threshold, the controller may temporarily stop the drums downstream of the accumulator 202, i.e., to pause the labeling operation. This pausing permits battery sections 72 to accumulate in the accumulator 202 since the upstream equipment may continue to process and deliver battery sections 72 to the accumulator 202. The sensor 204 detects when a sufficient number of battery sections 72 has accumulate in the accumulator 202 (i.e., exceeds the threshold), at which time the controller, based on the signal from the sensor 204, automatically re-starts the drums of system 200 to resume the labeling operation.

In example embodiments, a transfer drum 206 with flutes 50 around its outer perimeter receives battery sections 72 from the accumulator outlet 203. The transfer drum 206 may be similar to the drums 20-24 described with respect to FIG. 2b. For example, each flute 50 of the transfer drum 206 is sized to receive a single battery section 72. Each flute may also be provided with a resilient material 55 for contacting the battery section 72. Each flute 50 may also have at least one aperture (such as port 52 and opening 56) that is configured to selectively communicate a vacuum force to a cartridge unit seated in the flute 50, i.e., for keeping the battery section 72 seated in the flute 50.

In example embodiments, the system is arranged such that rotation of the drum 206 in a first rotational direction moves an empty flute 50 past and under the accumulator outlet 203. Gravity pulls a battery section 72 at the accumulator outlet 203 into the empty flute 50. In addition to or alternatively to gravity, air pressure and/or a positive force applied by a wheel or belt may be used to move the battery section 72 at the accumulator outlet 203 into the empty flute 50. Vacuum may also be selectively applied to the flute 50 to assist in pulling the battery section 72 from the accumulator outlet 203 into the empty flute 50. As the drum 206 continues to rotate, the trailing wall of the flute 50 strips the battery section 72 from the accumulator outlet 203. Vacuum may be selectively applied to the flute 50 to maintain the battery section 72 in the flute 50 until rotation of the drum 206 brings the cartridge unit to the next rotating drum 211.

At location 210, the battery sections 72 are transferred from the transfer drum 206 to a drum 211, which rotates in a second rotational direction opposite the first rotational direction of the drum 206. Each battery section 72 is held in a respective seat on the drum 211. A tagging system 215 is situated adjacent drum 211 and may include a tagging drum that rotates in the first rotational direction. In example embodiments, the tagging drum carries a plurality of labels and applies (i.e., tags) a respective label to a respective battery section 72 at location 225. The tagging system 215 may be structured and arranged to cut each individual label from a continuous web 216 that has a pressure sensitive adhesive on one side. The web 216 may be wound on a spool 217.

At location 230, each battery section 72 with its associated label is transferred from the drum 211 to a rolling drum 235, which rotates in the first rotational direction. Rolling drum 235 conveys each battery section 72 and its associated label into contact with belt 240. The belt 240 moves in a same direction as an adjacent portion of the surface of the rolling drum 235 but at a slightly slower speed than the rotation of the rolling drum 235, the speed difference between the belt 240 and the rolling drum 235 causing the battery section 72 to rotate in a direction that causes label to wrap itself around the exterior surface of the battery section 72. After the wrapping operation, the labeled battery sections 72 are transferred from the rolling drum 235 to a downstream inspection drum 245.

Still referring to FIG. 3, the labeler workstation 201 may include a detector 250 adjacent the inspection drum 245. The detector 250 may be similar to detector 40 described with respect to FIG. 2b and operates as part of an inspection system for inspecting each battery section 72 on the inspection drum 245. For example, the detector 250 may comprise one or more cameras or other optical detecting mechanisms that detect optical characteristics and/or information of the battery section 72 and transmit the detected optical characteristics and/or information to the controller "C." For inspection purposes, the controller "C" may determine whether a battery section 72 is out of specification, e.g., not properly labeled, damaged, etc., by comparing the detected optical characteristics to predefined optical criteria.

After the inspection at the inspection drum 245, the battery sections 72 may be transferred from the inspection drum 245 to a rejection drum 255. Any battery section 72 that is determined to be out of specification based on the inspection performed at the inspection drum 245 may be ejected from the rejection drum 255, e.g., by selectively applying a jet of air to the flute as indicated at location 260 to eject the battery section 72 from a flute of the rejection drum 255 into a reject chute or bin 265.

With continued reference to FIG. 3, the battery sections 72 are transferred from the rejection drum 255 to the assembler workstation 300. One or more rotating transfer drums 265a, 265b, . . . , 265n convey the battery sections 72 from the rejection drum 255 to the assembler workstation 300 using rotating drum transport principles as described with respect to FIGS. 2b-2d.

In example embodiments, the assembler workstation 300 includes a feed drum 305 with flutes around its outer perimeter that receives cartridge units 70 and battery sections 72. The feed drum 305 is a rotating drum similar to drums 20-24 of FIGS. 2b-2d in which each flute is sized to simultaneously hold a cartridge unit 70 and a battery section 72 in a spaced apart and axially aligned orientation. The feed drum 305 may receive the cartridge units 70 from an accumulator 310 in a manner similar to that described with respect to drum 206 and accumulator 202. The accumulator 310 may receive the cartridge units 70 from a conveyor 315 and may operate as a buffer between the conveyor 315 and the feed drum 305. The conveyor 315 may comprise a fluted drum and/or fluted belt that conveys a procession of assembled cartridge units 70 to the assembler workstation 300 from another part of an assembly line. For example, the conveyor 315 may receive the cartridge units 70 after each cartridge unit 70 has been assembled in the manner described with respect to step 10 of FIG. 2a.

Specifically, as shown in FIG. 3, the feed drum 305 receives a cartridge unit 70 in an empty flute on the perimeter of the feed drum 305 as the flute moves past the outlet of the accumulator 310 due to the rotation of the feed drum 305. After passing the accumulator 310, the flute holds only a cartridge unit 70 therein. The rotation of the feed drum 305 causes the flute holding the cartridge unit 70 to move from the outlet of the accumulator 310 toward a nip 316 between the feed drum 305 and the transfer drum 265n where a battery section 72 is transferred from the transfer drum 265n into the flute of the feed drum 305 using drum-to-drum transfer as described herein. After passing the nip 316, the flute holds the cartridge unit 70 (received from the accumulator 310) and the battery section 72 (received from the drum 265n). In example embodiments, the accumulator 310 and the transfer drum 265n are located relative to the feed drum 305 such that the cartridge unit 70 is received in a first section of the flute and the battery section 72 is received in a second section of the flute. In this manner, the cartridge unit 70 and the battery section 72 are held in the flute in a spatial orientation in which they are aligned with one another along their respective longitudinal axes, and are spaced apart from one another along this longitudinal direction. Vacuum may be used to hold the cartridge unit 70 and the battery section 72 in the flute in the manner described herein.

The rotation of the feed drum 305 causes the flute holding the cartridge unit 70 and the battery section 72 to move toward a nip 320 between the feed drum 305 and a transfer drum 325. At the nip 320, the cartridge unit 70 and the battery section 72 are both transferred from the flute of the feed drum 305 to a flute of the transfer drum 325 using drum-to-drum transfer as described herein. After passing the nip 320, the flute of the feed drum 305 is empty and moves toward to the accumulator 310 to receive another cartridge unit 70 and repeat the process.

Still referring to FIG. 3, in an example embodiment the cartridge unit 70 and the battery section 72 are transferred from the transfer drum 325 to an assembly drum 330 by way of at least one intermediate transfer drum 326. The cartridge unit 70 and the battery section 72 are held on the respective drums and moved from one drum to another using vacuum retention and drum-to-drum transfer as described herein. Any desired number of transfer drums 325 and 326 may be used between the feed drum 305 and the assembly drum 330. Alternatively, the transfer drums 325 and 326 may be omitted and the cartridge unit 70 and the battery section 72 may be moved directly from the feed drum 305 to the assembly drum 330.

In accordance with aspects described herein, the cartridge unit 70 and the battery section 72 that are held in a flute of the assembly drum 330 are connected to one another to form a completed electronic vapor device. In example embodiments, the connecting is performed by translating the cartridge unit 70 toward the battery section 72 in the flute (or vice versa), and rotating the cartridge unit 70 or battery section 72 or both relative to each other in the flute such that a physical engagement is established between the cartridge unit 70 and the battery section 72. A swash plate (shown in FIG. 6) may cause the translational movement by pushing the cartridge unit 70 toward the battery section 72 within the flute, and belts 335, 336 may cause the rotational movement by engaging respective surfaces of the cartridge unit 70 and the battery section 72 in the flute. The connected cartridge unit 70 and battery section 72 constitute a completed electronic vapor device 60 that is transferred from the assembly drum 330 to a next downstream drum 340 using drum to drum transfer as described herein.

Still referring to FIG. 3, the assembler workstation 300 may include a number of fluted drums 340-343 downstream of the assembly drum 330. In example embodiments, the drums 340-343 operate using rotating drum transport principles including vacuum retention and drum-to-drum transfer as described with respect to FIGS. 2b-2d. One or more detectors are provided for inspecting the assembled electronic vapor devices 60 downstream of the assembly drum 330. For example, a first detector 345 and a second detector 346 may be arranged adjacent inspection drums 340 and 341 downstream of the assembly drum 330. The detectors 345, 346 may comprise cameras or other optical detecting mechanisms that detect optical characteristics of the electronic vapor devices 60 and transmit the detected optical characteristics to a controller "C." In turn, the controller "C" may determine whether an electronic vapor device 60 is out of specification, e.g., damage to the label on the cartridge unit 70, damage to the label on the battery section 72, amount of gap between the cartridge unit 70, damage to the label on the battery section 72, overall length of the assembled electronic vapor device 60 etc., by comparing the detected optical characteristics to predefined optical criteria. Any electronic vapor device 60 that is determined to be out of specification based on the detecting may be ejected from one of the rotating drums, e.g., by application of a jet of air at 350 to eject the electronic vapor device 60 from a flute of the drum 342 and into a reject chute or bin 355.

FIG. 4 shows a flute 405 of the assembly drum 330 in accordance with aspects herein. The flute 405 may be similar to flute 50 shown in FIGS. 2c and 2d in that the flute 405 is at the outer roll face 410 of the assembly drum 300 and a longitudinal axis 411 of the flute 405 is perpendicular to the direction of rotation of the assembly drum 330. In example embodiments, the flute 405 includes vacuum ports 420 for communicating a vacuum to a cartridge unit 70 and a battery section 72 positioned in the flute 405. The flute 405 may also include at least one air bearing port 425 for providing an air bearing between the surface of the flute 405 and at least one of the cartridge unit 70 and the battery section 72, as described in greater detail herein.

Still referring to FIG. 4, the assembly drum 330 may also include first rollers 435 extending outward from the roll face 410 on opposite sides of the flute 405. The assembly drum may also include second rollers 436 extending outward from the roll face 410 on opposite sides of the flute 405. The rollers 435 and 436 are configured to engage the belts 335 and 336, respectively, as described in greater detail with respect to FIGS. 7 and 8. In example embodiments, the roll face 410 of the assembly drum 330 includes a plurality of flutes 405 and associated sets of rollers 435, 436.

FIGS. 5a-5c show aspects of connecting a cartridge unit 70 and a battery section 72 in a flute 405 of the assembly drum 330. FIG. 5a shows the cartridge unit 70 and the battery section 72 in a flute 405 at a first rotational position of the assembly drum 330. FIG. 5b shows the cartridge unit 70 and the battery section 72 in a flute 405 at a second rotational position of the assembly drum 330 after the first rotational position. FIG. 5c shows the cartridge unit 70 and the battery section 72 in a flute 405 at a third rotational position of the assembly drum 330 after the second rotational position.

As shown in FIG. 5a, the cartridge unit 70 and the battery section 72 are initially held in the flute 405 in an axially aligned and spaced apart relation relative to one another. Specifically, a longitudinal axis 505 of the cartridge unit 70 is substantially aligned (coaxial) with a longitudinal axis 506 of the battery section 72 and parallel to the axis 411 of the flute 405. Moreover, there is a clearance 507 between the connection structure 501 of the cartridge unit 70 and the connection structure 502 of the battery section 72. In example embodiments, an end of the battery section 72 opposite the connection structure 502 is held against a limit stop 510, which may be any suitable structure that is affixed to or part of the assembly drum 330 that prevents movement of the battery section 72 in the direction indicated by arrow 511.

Figure 6:
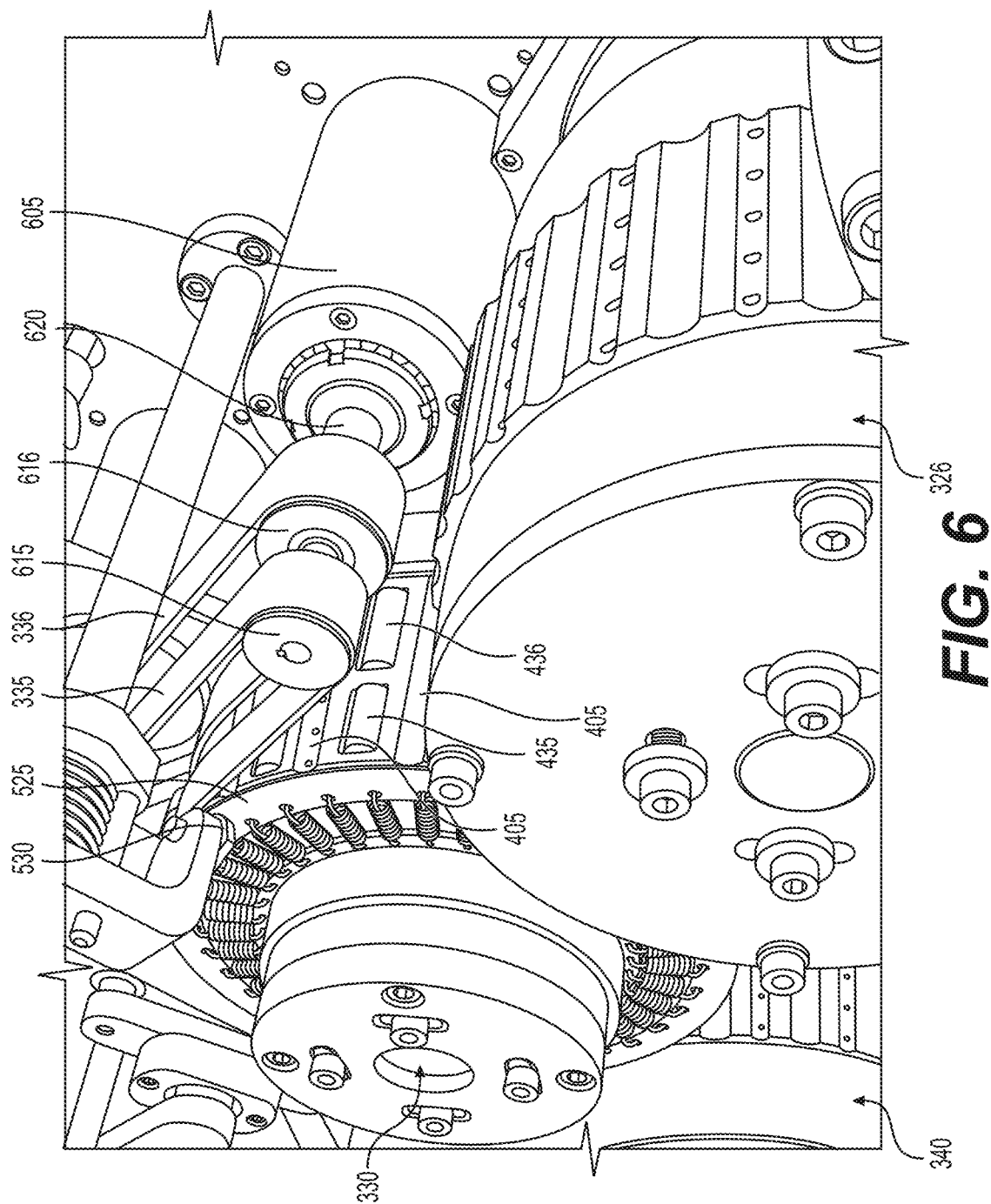
FIGS. 6 and 7 show aspects of an assembly drum and belts in accordance with an example embodiment.

As shown in FIG. 5b, the cartridge unit 70 is translated in the flute 405 toward the battery section 72. The translation may be caused, for example, by a swash plate 525 connected to the assembly drum 330 as shown in FIG. 6. In an example embodiment, the swash plate 525 rotates with the assembly drum and is pushed inward toward the flute 405 by a pusher 530 as shown in FIG. 6. The pusher 530 may comprise, for example, a roller or cam that is fixedly mounted to remain stationary while the assembly drum 330 rotates. As the swash plate 525 and the assembly drum 330 rotate past the pusher 530, the pusher 530 contacts a portion of the swash plate 525 and pushes (moves) that portion of the swash plate 525 toward the assembly drum 330, and this inward movement causes the swash plate 525 to contact the cartridge unit 70 and push the cartridge unit 70 toward the battery section 72 in the flute 405 as shown in FIG. 5b.

In an example embodiment, the first connection structure 501 is a male threaded structure and the second connection structure 502 is a female threaded structure that corresponds to the male threaded structure in size and shape. In this embodiment, the length of the flute 405 as defined by the limit stop 510 is configured such that the translational movement of the cartridge unit 70 by the swash plate 525 causes the first connection structure 501 to be positioned sufficiently close relative to the second connection structure 502 such that subsequent rotation of the cartridge unit 70 or battery section 72 or both will cause the male threaded structure to threadingly engage female threaded structure.

As shown in FIG. 5c, the cartridge unit 70 or the battery section 72 or both are rotated in the flute 405 to complete the connection of the first connection structure 501 and the second connection structure 502, resulting in the cartridge unit 70 and battery section 72 being combined as a completed electronic vapor device 60. In example embodiments, the rotation depicted in FIG. 5c is achieved using at least one of the belts 335 and 336. The elements of the assembler workstation may be structured and arranged such that the belt 335 causes the cartridge unit 70 to rotate about its axis 505 within the flute 405, and such that belt 336 causes battery section 72 to remain stationary within the flute 405 while the cartridge unit 70 is rotating (or vice versa), thereby causing relative rotation between the cartridge unit 70 and the battery section 72 that operates to thread the first connection structure 501 into to the second connection structure 502.

With continued reference to FIGS. 5b and 5c, the translation and the rotation may occur in successive steps or may occur simultaneously. In an example embodiment, the belt 335 engages the cartridge unit 70 and begins to rotate the cartridge unit 70 while the swash plate 525 is translating the cartridge unit 70 in the flute 405. In this manner, the cartridge unit 70 is rotating as it translates toward the battery section 72. In this embodiment, the belt 335 continues to rotate the cartridge unit 70 after a termination of the translational movement caused by the swash plate 525, and this continued rotation operates to thread the first connection structure 501 into to the second connection structure 502.

Figure 7:
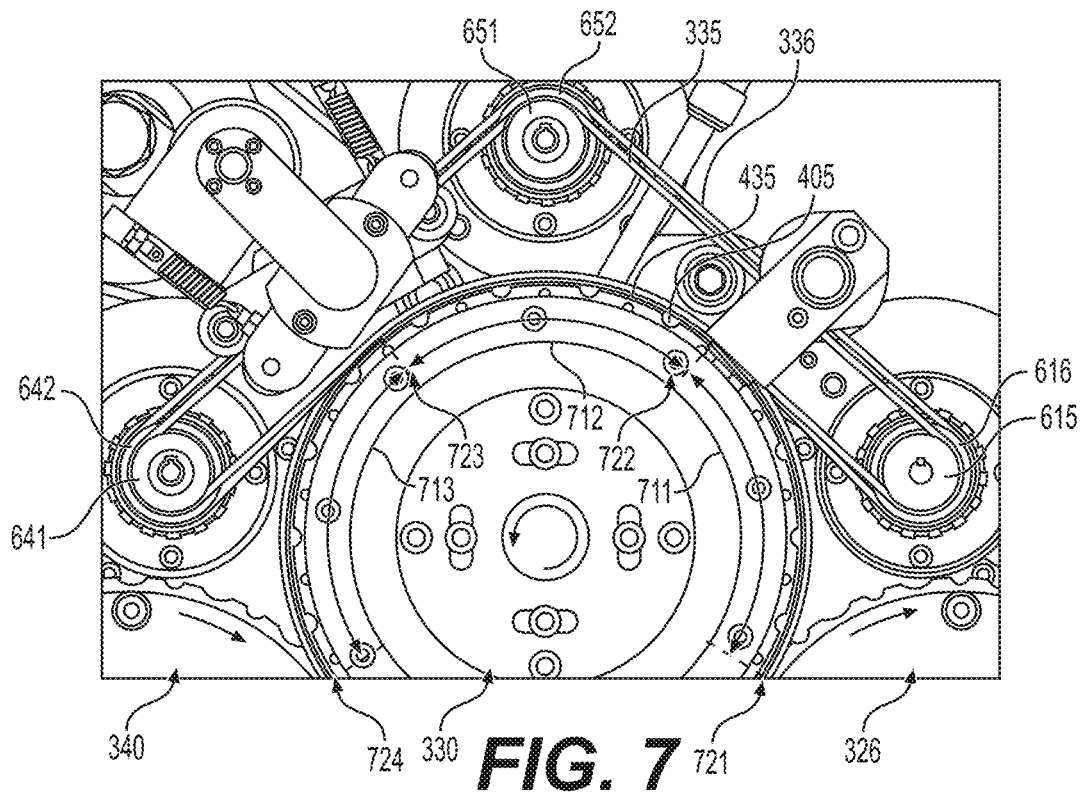

FIGS. 6 and 7 show aspects of the assembly drum 330 and the belts 335 and 336 in accordance with aspects herein. In example embodiments, the assembly drum 330 includes plural flutes 405, rollers 435 aligned with belt 335, and rollers 436 aligned with belt 336. The swash plate 525 is connected to the assembly drum 330 and the pusher 530 mounted in a fixed relationship relative to the swash plate 525 and the assembly drum 330 (the swash plate 525 is omitted from view in FIG. 7 to illustrate other elements). In the implementation depicted in FIGS. 6 and 7, the belts 335 and 336 are both driven by a same actuator 605 by way of a first drive wheel 615 and a second drive wheel 616 connected to a rotating shaft 620 extending from the actuator 605. Alternatively, the belts 335 and 336 may be driven independent of one another using separate actuators.

According to aspects herein, the first belt 335 is driven at a first speed relative to the assembly drum 330 and the second belt 336 is driven at a second speed relative to the assembly drum 330 different than the first speed. By driving the belts 335 and 336 at different speeds, the rotational motion of the cartridge unit 70 relative to the battery section 72 described with respect to FIG. 5c is obtained. In an example embodiment, the second belt 336 is driven at a second speed substantially equal to the rotational speed of the roll face 410 of the assembly drum 330. In this manner, when the second belt 336 engages the battery section 72 in the flute 405, the speed of the second belt 336 matches the speed at which the battery section 72 is being moved by the assembly drum 330 such that the second belt 336 holds the battery section 72 in the flute 405 without rotating the battery section 72 relative to the flute 405. Also, the first belt 335 may be driven at a first speed that is different than the rotational speed of the assembly drum 330. In this manner, when the first belt 336 engages the cartridge unit 70 in the flute 405, the difference in speed between the first belt 335 and the assembly drum 330 causes the cartridge unit 70 to rotate within the flute 405. The first speed of the first belt 335 may be faster or slower than the rotational speed of the assembly drum 330 depending on the desired rotational direction of the cartridge unit 70 within the flute 405 and relative to the battery section 72. Specifically, the first speed of the first belt 335 may be selected to cause the cartridge unit 70 to rotate in a direction relative to the battery section 72 that causes the male threaded structure of the first connection structure 501 to engage and drive into the female threaded structure of the second connection structure 502.

With continued reference to FIGS. 6 and 7, in example embodiments the first drive wheel 615 and the second drive wheel 616 have different respective diameters, which operate to drive the belts 335 and 336 at different respective speeds as described herein. As particularly shown in FIG. 7, the first belt 335 may be driven as an endless loop around the first drive wheel 615 and two other wheels 641 and 651, and the second belt 336 may be driven as an endless loop around the second drive wheel 616 and two other wheels 642 and 652. The wheels 615, 641, and 651 may each have a smaller diameter than the wheels 616, 642, and 652. This arrangement of wheels is not limiting, however, and any suitable system may be used for driving the first belt 335 at a different speed than the second belt 336.

In example embodiments, the belts 335 and 336 are composed of a material that has a relatively high coefficient of friction such that the belts 335 and 336 sufficiently engage cartridge unit 70 and the battery section 72, respectively, when the belts come into contact with these elements. For example, the belts 335 and 336 may be composed of (or coated with) non-slick natural rubber. Conversely, the surface of the flute 405 may be coated with a material that has a relatively low coefficient of friction to permit the cartridge unit 70 and/or the battery section 72 to move within the flute 405. An example of an acceptable coating material may be nickel-phosphor alloy, although any suitable coating may be used.

FIG. 7 also shows areas where vacuum is selectively communicated to the flutes 405 of the assembly drum 330 in accordance with aspects herein. The assembly drum 330 may include a rotatable drum portion and a fixed internal vacuum plenum that are structured and arranged to selectively apply a vacuum force to the vacuum ports 420 in a particular flute 405 based on the angular position of the particular flute 405 along the rotational path of the rotatable drum portion, e.g., in a manner similar to that described with respect to FIG. 2b. In example embodiments, the vacuum system of the assembly drum 330 is configured to communicate vacuum to the ports 420 of a particular flute 405 when the flute 405 is moving through the regions 711 and 713, and to not communicate vacuum to the ports 420 of the flute 405 when the flute 405 is moving through the regions 712.

Region 711 extends from a first location 721 where a flute 405 receives a cartridge unit 70 and a battery section 72 from the upstream drum 326 to a second location 722 where the belts 335 and 336 come into contact with the cartridge unit 70 and the battery section 72 held in the flute 405. Region 712 extends from the second location 722 to a third location 723 where the belts 335 and 336 go out of contact with the cartridge unit 70 and the battery section 72 held in the flute 405. Region 713 extends from the third location 723 to a fourth location 724 where the completed electronic vapor device 60 is transferred from the flute 405 to another flute of the downstream drum 340. In this manner, vacuum is interrupted (not applied) to the flute 405 when the cartridge unit 70 and/or the battery section 72 are undergoing the translational and rotational movements as described with respect to FIGS. 5b and 5c.

Figure 8A:
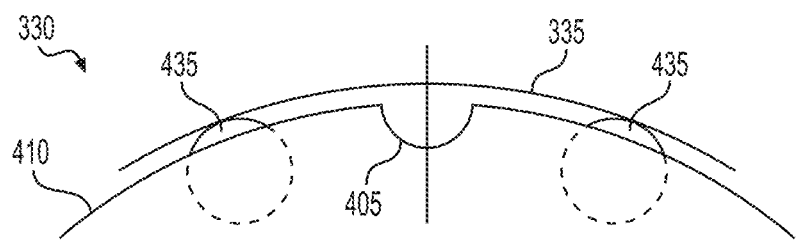
FIGS. 8a and 8b show aspects of an assembly drum, flute, and belt in accordance with an example embodiment.
Figure 8B:
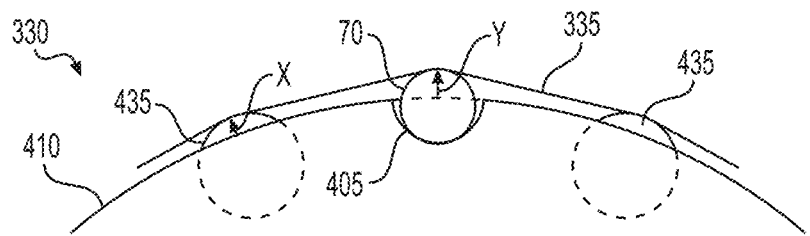
Figure 9:
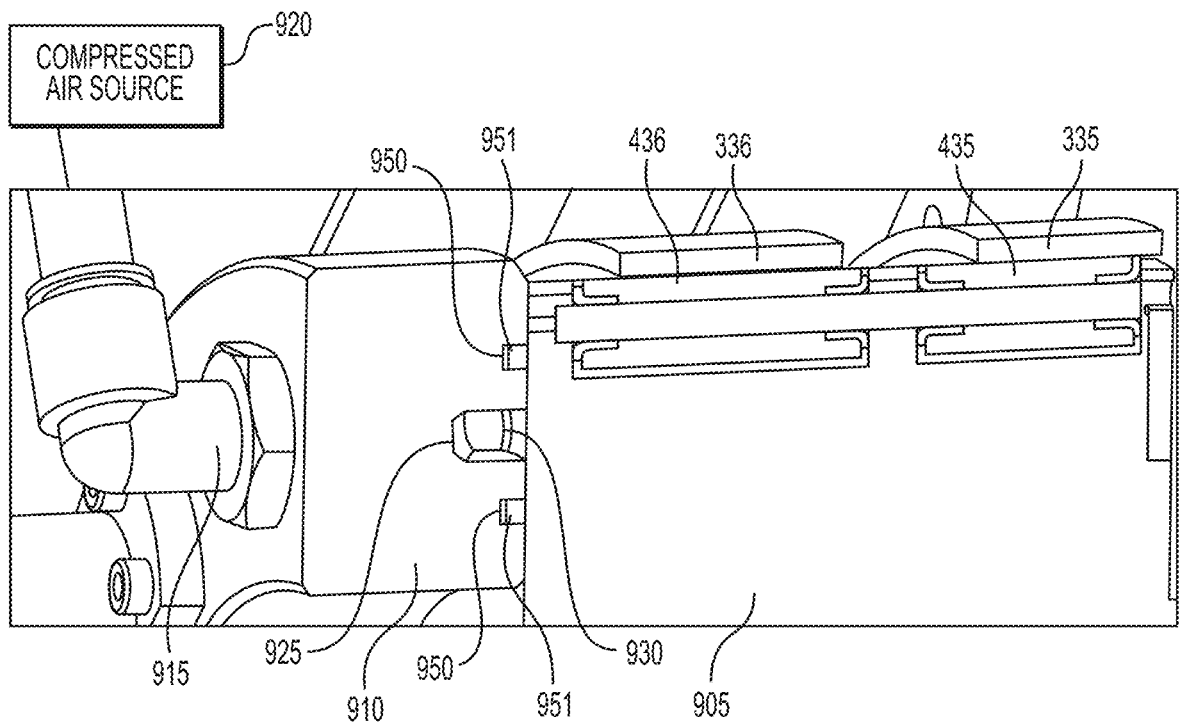
FIG. 9 shows a cutaway view of a portion of an assembly drum and a manifold in accordance with an example embodiment.

FIG. 8a shows a side view of the assembly drum 330 with an empty flute 405. FIG. 8b shows a side view of the assembly drum 330 with a cartridge unit 70 in the flute 405. In example embodiments, the rollers 435 extend radially outward beyond the roll face 410 of the assembly drum 330 by a dimension "X", and the cartridge unit 70 extends radially outward beyond the roll face 410 by a dimension "Y." The rollers 435 are configured such that the magnitude of dimension X is sufficient to provide a clearance 805 between the belt 335 and the roll face 410 when the flute 405 is empty, as shown in FIG. 8a. The rollers 435 are also configured such that the magnitude of dimension X is less than the magnitude of dimension Y, such that the belt 335 engages the outer surface of the cartridge unit 70 that is held in the flute 405, as shown in FIG. 8b. The rollers 435 may comprise, for example, bearings that are rotatably mounted in the assembly drum 330 and that are free to rotate about an axis that is parallel to and offset from the axis 411 of the flute 405, for example as shown in FIG. 9. Alternatively, the rollers 435 may comprise bushings that are fixed relative to the assembly drum 330 and composed of a material that provides low-friction contact with the belt 335. The rollers 436 may be arranged in a manner similar to the rollers 435 to provide a clearance between the belt 336 and the roll face 410 while permitting the belt 336 to engage the battery section 72.

FIG. 9 shows a cutaway view of a portion of the assembly drum 330 in accordance with aspects herein. Specifically, FIG. 9 shows a rotatable drum portion 905 of the assembly drum 330 that rotates around a fixed internal vacuum plenum (not shown). As described herein, the geometry of the rotatable drum portion 905 and the fixed internal vacuum plenum are structured and arranged to selectively apply a vacuum force to the vacuum ports 420 in a particular flute 405 based on the angular position of the particular flute 405 along the rotational path of the rotatable drum portion 905, e.g., in the manner described with respect to FIGS. 2b and 7.

FIG. 9 also shows an air system that operates to selectively supply compressed air to the air bearing ports 425 of a flute 405 in accordance with aspects herein. In example embodiments, the air system includes a manifold 910 adjacent the rotatable drum portion 905 of the assembly drum 330. The manifold 910 remains stationary while the rotatable drum portion 905 rotates, and is structured and arranged to communicate compressed air to the air bearing ports 425 of a particular flute 405 as the flute 405 moves past a particular portion of the manifold 910.

Figure 10:
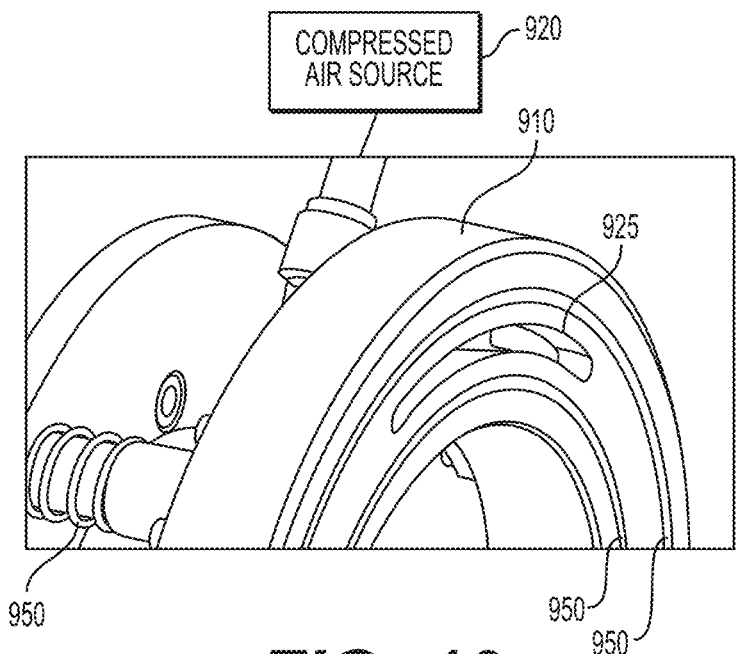
FIG. 10 shows aspects of a manifold in accordance with an example embodiment.

The manifold 910 may include an inlet 915 that is connected to a compressed air source 920, such as shop air. The manifold 910 may also include an outlet port 925 that is fluidically connected to the inlet 915 by one or more internal passages in the body of the manifold 910. As shown in FIG. 10, the outlet port 925 has a limited extent that corresponds to a portion of the region 712 shown in FIG. 7.

With continued reference to FIG. 9, the rotatable drum portion 905 of the assembly drum 330 includes at least one port 930 associated with each respective flute 405. The port 930 is fluidically connected to the air bearing ports 425 of its associated flute 405 by one or more internal passages in the rotatable drum portion 905. In example embodiments, the rotatable drum portion 905 and the manifold 910 are sized and shaped such that, during rotation of the rotatable drum portion 905, the port 930 moves past the outlet port 925 to temporarily place the port 930 in fluidic communication with the outlet port 925. While the port 930 is in communication with the outlet port 920, compressed air is communicated from the manifold 910 to the air bearing ports 425 that are connected to the port 930. The compressed air flows out of the air bearing ports 425 and exerts a force in a radially outward direction on the cartridge unit 70 and the battery section 72 that are in the flute 405. In this manner, the compressed air operates to create an air bearing between the surface of the flute and the cartridge unit 70 and the battery section 72. The air bearing reduces the friction between the surface of the flute and the cartridge unit 70 and the battery section 72, which facilitates the translational and rotational movement described with respect to FIGS. 5b and 5c.

Still referring to FIG. 9, in example embodiments the manifold 910 includes grooves 950 that receive protrusions 951 of the rotatable drum portion 905. The grooves 950 and protrusions 951 cooperate to form sealing rings around the outlet port 920 to inhibit compressed air from escaping along a path between the surfaces of the manifold 910 and the rotatable drum portion 905. The manifold 910 may be resiliently biased toward the rotatable drum portion 905, for example by one or more springs 960, to maintain a sealing engagement between the grooves and protrusions 951.

Figure 11:
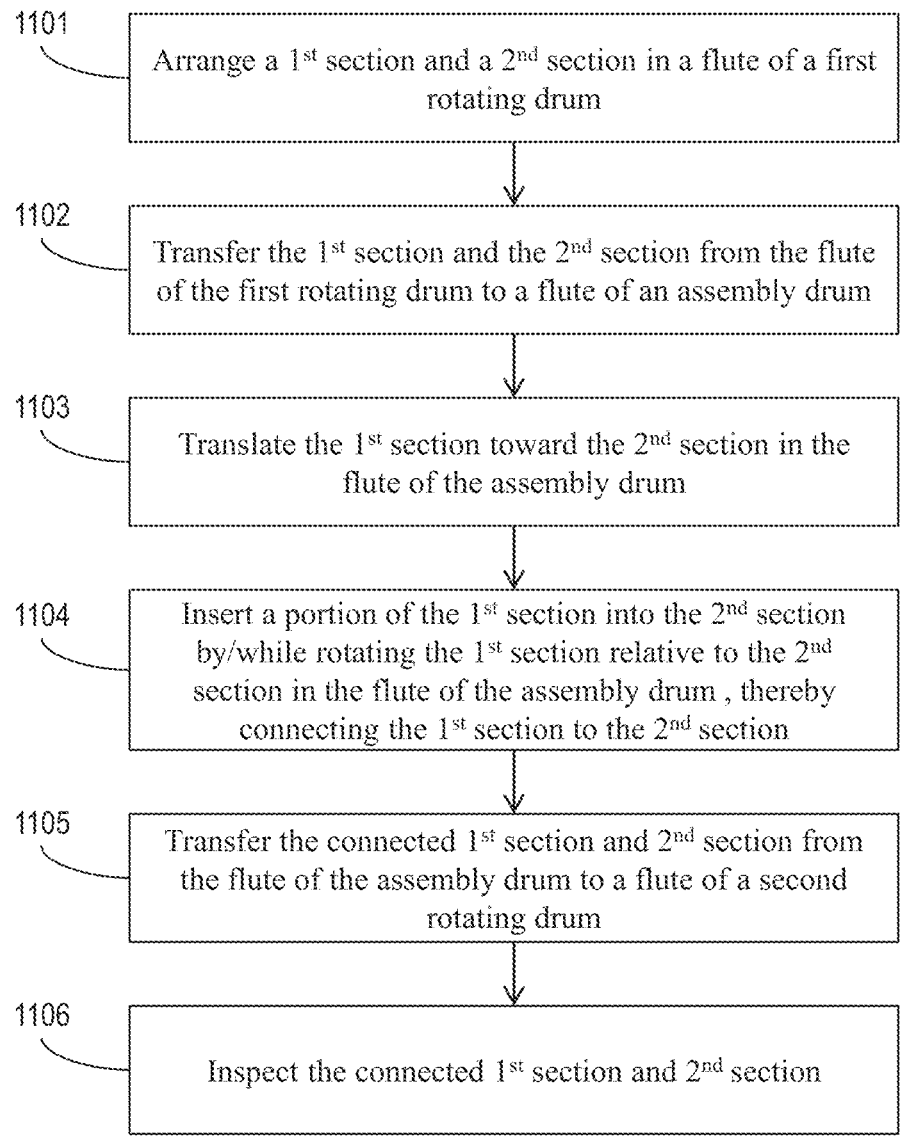
FIG. 11 shows a flow diagram that illustrates steps of a process in accordance with an example embodiment.

FIG. 11 shows a flow diagram 1100 that illustrates steps of a process in accordance with aspects herein. At step 1101, a first section and a second section of a product are arranged in a flute of a first rotating drum. The first and second sections may include, for example, sections of an electronic vapor-generating article, such as electronic vaping article. Specifically, the first and second sections may include sections of an electronic vapor device. More specifically, the first section may include a cartridge unit 70 and the second section may include a battery section 72 as described herein. The rotating drum in step 1101 may be, for example, the feed drum 305 as described with respect to FIG. 3. For example, step 1101 may include transferring a cartridge unit 70 from an accumulator 310 to a flute of the feed drum 305, and also transferring a battery section 72 from a drum 265n to the same flute of the feed drum 305, as described with respect to FIG. 3.

At step 1102, the first section and the second section are transferred from the flute of the first rotating drum to a flute of an assembly drum. In example embodiments, the transferring includes drum-to-drum transfer of the cartridge unit 70 and the battery section 72 directly from the feed drum 305 to the assembly drum 330 or indirectly from the feed drum 305 to the assembly drum 330 by way of one or more intermediate transfer drums (e.g., drums 325, 326), as described in FIG. 3 for example.

At step 1103, the first section is moved in a translational direction in the flute of the assembly drum and relative to the second section. In example embodiments, the translational movement is caused by a first mechanism that moves the first section relative to the second section while the first section and the second section are in the flute. In a non-limiting embodiment, the translational movement is caused by a first mechanism comprising a swash plate or other suitable mechanism that moves the cartridge unit 70 toward the battery section 72 in the flute in a manner similar to the described with respect to FIG. 5b.

At step 1104, the first section is moved in a rotational direction in the flute of the assembly drum and relative to the second section. In example embodiments, the rotational movement is caused by a second mechanism that rotates the first section relative to the second section while the first section and the second section are in the flute. In a non-limiting embodiment, the rotational movement is caused by a second mechanism including a first belt 335 that engages the cartridge unit 70 and rotates the cartridge unit 70 within the flute, and a second belt 336 that engages the battery section 72 and holds the battery section 72 stationary within the flute. In example embodiments, the rotational movement causes a first connection structure 501 of the cartridge unit 70 to engage a second connection structure 502 of the battery section 72 for coupling the cartridge unit 70 to the battery section 72 to form a complete electronic vapor device 60. Step 1104 may be performed partially or entirely concurrently with step 1103.

At step 1105, the connected first and second sections are transferred from the flute of the assembly drum to a flute of a downstream drum. In example embodiments, step 1105 includes transferring the complete electronic vapor device 60 from the assembly drum 330 to drum 340 using drum-to-drum transfer, as described in FIG. 3 for example.

At step 1106, the connected first and second sections are inspected. In example embodiments, the inspection includes performing at least one optical inspection of the complete electronic vapor device 60 using at least one detector 345, 346 and a controller "C" as described with respect to FIG. 3. The inspection may include at least one of: inspecting a size of a gap between the connected first and second sections; inspecting an overall length of the connected first and second sections; and inspecting an appearance of one or more labels on the connected first and second sections. Step 1106 may also include ejecting any connected first and second sections that fail the inspection as being out of specification.

In example embodiments, each of steps 1101-1106 are performed in an automated manner, i.e., without a human operator touching the cartridge unit 70 and/or the battery section 72 during any of the steps.

Although various non-limiting embodiments described herein translate and rotate the first section 70, it is contemplated that instead of, or in addition, the second section 72 may be translated and/or rotated.

The particulars shown herein are by way of example and for purposes of illustrative discussion only and are presented in the cause of providing what is believed to be the most useful and readily understood description of the principles and conceptual aspects. In this regard, no attempt is made to show structural details in more detail than is necessary for fundamental understanding, the description taken with the drawings making apparent to those skilled in the art how the several forms disclosed herein may be embodied in practice.

It is noted that the foregoing examples have been provided merely for the purpose of explanation and are in no way to be construed as limiting. While aspects have been described with reference to an example embodiment, it is understood that the words which have been used herein are words of description and illustration, rather than words of limitation. Changes may be made, within the purview of the appended claims, as presently stated and as amended, without departing from the scope and spirit of the present disclosure in its aspects. Although aspects have been described herein with reference to particular means, materials, and/or embodiments, the present disclosure is not intended to be limited to the particulars disclosed herein; rather, it extends to all functionally equivalent structures, methods and uses, such as are within the scope of the appended claims.

The invention claimed is:

1. An assembler system for assembling an electronic vaping article, comprising:
    an assembly drum configured to align a first section and a second section of the electronic vaping article;
    a first mechanism configured to displace the first section toward the second section; and
    a second mechanism configured to rotate at least one of the first section or the second section on the assembly drum so as to connect the first section to the second section.

2. The assembler system of claim 1, wherein one of the first section or the second section is a cartridge unit, and the other of the first section or the second section is a battery section.

3. The assembler system of claim 1, wherein the first mechanism includes a swash plate configured to push the first section.

4. The assembler system of claim 3, wherein the swash plate is configured to rotate with the assembly drum.

5. The assembler system of claim 3, wherein the first mechanism includes a stationary pusher configured to move a portion of the swash plate to push the first section.

6. The assembler system of claim 5, wherein the stationary pusher includes a roller or a cam.

7. The assembler system of claim 1, wherein the second mechanism includes a first belt configured to engage the first section.

8. The assembler system of claim 7, wherein the second mechanism includes a second belt configured to engage the second section.

9. The assembler system of claim 8, wherein the first belt is configured to be driven at a first speed, and the second belt is configured to be driven at a different second speed.

10. The assembler system of claim 8, wherein the assembly drum includes first rollers and second rollers, the first rollers extending outward from the assembly drum and configured to engage the first belt, the second rollers extending outward from the assembly drum and configured to engage the second belt.

11. The assembler system of claim 1, wherein the first mechanism and the second mechanism are configured to push and rotate the first section simultaneously.

12. The assembler system of claim 1, wherein the assembly drum includes at least one vacuum port and a vacuum system configured to selectively communicate a vacuum to the first section and the second section through the at least one vacuum port.

13. The assembler system of claim 12, wherein the vacuum system is configured to interrupt the vacuum when the first section is being pushed and rotated.

14. The assembler system of claim 1, wherein the assembly drum includes at least one air bearing port and an air bearing system configured to selectively communicate a pressurized gas to the at least one air bearing port.

15. The assembler system of claim 14, wherein the air bearing system includes a manifold, the manifold including an inlet and an outlet port, the inlet being in fluidic communication with a source of the pressurized gas, the outlet port configured to be temporarily in fluidic communication with a port of the assembly drum during a rotation of the assembly drum, the port of the assembly drum being in fluidic communication with the at least one air bearing port.

16. The assembler system of claim 1, further comprising:
a feed drum arranged upstream from the assembly drum, the feed drum configured to receive the first section at a first rotational position of the feed drum, the feed drum configured to receive the second section at a second rotational position of the feed drum.

17. The assembler system of claim 16, wherein the feed drum is configured to transfer the first section and the second section to the assembly drum at a third rotational position of the feed drum.

18. The assembler system of claim 16, further comprising:
a transfer drum arranged upstream from the assembly drum and downstream from the feed drum, the feed drum configured to transfer the first section and the second section to the transfer drum at a third rotational position of the feed drum and prior to the first section and the second section being received by the assembly drum.

* * * * *